(12) United States Patent
Pedersen et al.

(10) Patent No.: US 8,370,687 B2
(45) Date of Patent: Feb. 5, 2013

(54) MECHANISM FOR STORING AND EXTRACTING TRACE INFORMATION USING INTERNAL MEMORY IN MICRO CONTROLLERS

(75) Inventors: Frode Milch Pedersen, Trondheim (NO); Are Arseth, Trondheim (NO)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/527,502

(22) Filed: Jun. 19, 2012

(65) Prior Publication Data

US 2012/0254668 A1 Oct. 4, 2012

Related U.S. Application Data

(63) Continuation of application No. 12/616,655, filed on Nov. 11, 2009, now Pat. No. 8,219,855, which is a continuation of application No. 11/148,049, filed on Jun. 7, 2005, now abandoned.

(51) Int. Cl.
*G06F 11/00* (2006.01)

(52) U.S. Cl. ......................................................... 714/30

(58) Field of Classification Search ............... 714/25–31, 714/34–37, 38.1, 39, 41, 45, 47.1, 48, 733, 714/734
See application file for complete search history.

(56) References Cited

U.S. PATENT DOCUMENTS

| | | | |
|---|---|---|---|
| 5,943,498 A | 8/1999 | Yano et al. | |
| 5,944,841 A | 8/1999 | Christie | |
| 5,958,061 A | 9/1999 | Kelly et al. | |
| 6,154,857 A | 11/2000 | Mann | |
| 6,167,536 A | 12/2000 | Mann | |
| 6,314,530 B1 | 11/2001 | Mann | |
| 6,378,064 B1 | 4/2002 | Edwards et al. | |
| 6,467,083 B1 | 10/2002 | Yamashita | |
| 6,769,054 B1 * | 7/2004 | Sahin et al. | 711/162 |
| 6,813,731 B2 * | 11/2004 | Zahavi et al. | 714/45 |
| 6,922,795 B2 | 7/2005 | Miyayama et al. | |
| 7,213,113 B2 * | 5/2007 | Sahin et al. | 711/162 |
| 2002/0120815 A1 * | 8/2002 | Zahavi et al. | 711/118 |
| 2004/0221115 A1 * | 11/2004 | Sahin et al. | 711/154 |
| 2005/0102579 A1 | 5/2005 | Miyayama et al. | |
| 2005/0120337 A1 * | 6/2005 | Serrano et al. | 717/127 |
| 2006/0075310 A1 * | 4/2006 | Tagawa | 714/45 |
| 2006/0112310 A1 | 5/2006 | McHale et al. | |
| 2006/0277435 A1 | 12/2006 | Pedersen et al. | |
| 2007/0006035 A1 | 1/2007 | Usui | |
| 2007/0214341 A1 | 9/2007 | Das | |

FOREIGN PATENT DOCUMENTS

WO WO2006133362 A2 12/2006

OTHER PUBLICATIONS

"U.S. Appl. No. 11/148,049, Response filed Jun. 18, 2008 to Non-Final Office Action mailed Mar. 18, 2008", 10 pages.
"U.S. Appl. No. 11/148,049, Non-Final Office Action mailed Mar. 18, 2008", 7 pages.
"U.S. Appl. No. 11/148,049, Final Office Action mailed Sep. 29, 2008", 5 pages. International Search Report of PCT application No. PCT/US2006/022306, dated Mar. 24, 2008, 2 pages.
Written Opinion of PCT application No. PCT/US2006/022306 dated Mar. 24, 2008, 4 pages.

* cited by examiner

*Primary Examiner* — Nadeem Iqbal
(74) *Attorney, Agent, or Firm* — Fish & Richardson P.C.

(57) ABSTRACT

This document relates to apparatus and methods to store and retrieve trace information in on-chip system memory of microcontrollers. A microcontroller comprises a microprocessor and a memory device accessible through a data bus and an address bus coupled to the microprocessor. The microcontroller includes on-chip debug logic coupled to the microprocessor. Trace data can be retrieved from system memory using a debug port of the debug logic. A system in accordance with the present invention will lower the cost of implementation of trace features in microcontrollers, and strongly reduce the cost of supporting such features in debug tools.

17 Claims, 5 Drawing Sheets

MECHANISM FOR STORING AND EXTRACTING TRACE INFORMATION USING INTERNAL MEMORY IN MICRO CONTROLLERS

RELATED APPLICATIONS

This application is a continuation of U.S. patent application Ser. No. 12/616,655 filed on Nov. 11, 2009 now U.S. Pat. No. 8,219,855, which is a continuation of U.S. patent application Ser. No. 11/148,049, filed on Jun. 7, 2005 now abandoned, which is incorporated herein by reference in its entirety.

TECHNICAL FIELD

The present invention relates generally to on-chip debug functionality in microcontrollers and microprocessors that contain on-chip memory and more specifically to storing trace information in and extracting such information from on-chip memory.

BACKGROUND

Figure 1:
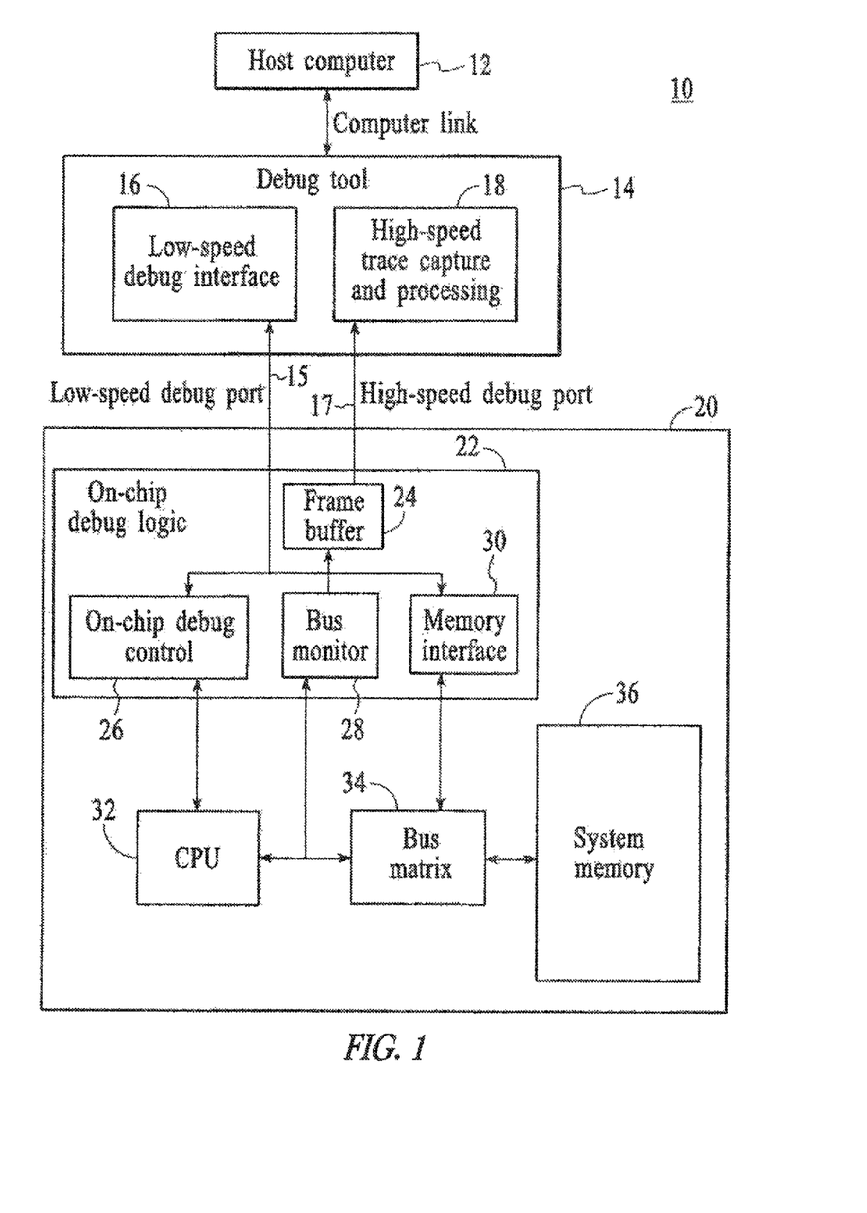
FIG. 1 shows a conventional debug system with direct memory access and trace support.

FIG. 1 shows a conventional debug system 10 with direct memory access and trace support. The debug system 10 comprises a host computer 12, a debug tool 14, a low speed debug interface 16, a high speed trace capture and processing unit 18, a low-speed debug port 15, a high-speed trace port 17, a microcontroller device 20 and a system memory 36. The microcontroller device 20 includes an on-chip debug logic 22, a frame buffer 24, an on-chip debug control 26, a bus monitor 28, a memory interface 30, a CPU 32 and a bus matrix 34. Traditionally, electronic systems with advanced control or data processing requirements would contain separate CPU 32 and memory devices, soldered onto the same printed circuit board. During developing and debugging embedded software, it was thus possible to use logic analyzers to probe the system bus to identify and capture events useful for software debugging. With the advent of powerful microcontrollers with on-chip memories, the system bus resides within the device, and the bus events are no longer available for direct capture. The problem becomes particularly noticeable as microcontrollers become ever more complex, with a corresponding increase in software complexity. As many embedded systems involve real-time communication, control, or data processing, the debugging task becomes further complicated, as more debug features have to be non-intrusive, i.e., not disrupt the real-time software execution.

To avoid software development time increasing exponentially, on-chip debug (OCD) logic 22 is required to assist in observing and controlling the embedded processor through a set of debug features. A debug tool 14 interfaces between the development software on a host computer 12 and the OCD logic 22 through a debug port 15 (e.g. JTAG) and a trace port 17.

The most basic debug features involve intrusive control of CPU 32 operation. This includes breakpoints, to selectively halt the CPU 32 based on a specific condition, and methods to examine the CPU 32 registers and restart the CPU 32 to normal operation. These debug features are normally controlled by a set of debug registers, accessible through a debug interface, e.g., JTAG. As all real-time events are handled by the OCD logic 22, the debug tool 14 does not have to contain high-speed logic, and can be designed in a simple, low-cost fashion.

The basic debug features allow intrusive debug access to system memory 36 by halting the CPU 32, and issuing instructions to examine or alter the system memory 36. However, with the increasing complexity of embedded real-time systems, non-intrusive direct memory access to system memory 36 has become a requirement (e.g. Nexus 2.0 standard, IEEE ISTO5001™-2003, class 3). This enables the debug tool 14 to use the low-speed debug port 15 to observe and alter memory without requiring the CPU 32 to be halted.

More advanced are trace features which replace the traditional logic analyzers, and thus constitute an important part of on-chip debugging in complex microcontroller applications. This involves reconstructing the program or data flow of the embedded software to identify the point of incorrect program execution. This is accomplished by logging a sequence of characteristic debug events, collectively known as trace information, such as program branches, and system bus accesses, during the software execution. Data is supplied with each event to relate the event to the execution, allowing the exact execution sequence to be reconstructed.

Trace information is formatted into messages, consisting of frames, corresponding to one set of data on the trace port 17 of the device. The trace information is generated in bursts, resulting in a very high peak frame rate. The average frame rate is usually much lower, and it is therefore economical to keep the generated frames in a frame buffer 24, and transmit them through the trace port 17 at a frame rate closer to the average frame rate. The trace information can then be captured, stored, and analyzed by the debug tool 14.

The trace features are nevertheless very bandwidth intensive. The frame buffer 24 and dedicated trace port 17 add to the cost of the microcontroller 20. The high bandwidth also strongly increases the cost of the debug tool 14, which requires complex and expensive hardware to capture and process the vast amount of high-speed trace information.

The trace frames are normally stored in a large buffer within the debug tool 14, allowing for a relatively long real-time trace sequence to be captured. However, many software debug situations do not require the entire trace sequence, only the first messages (e.g. exit from an interrupt handler), or last messages (e.g. illegal entry to a trap). Thus, trace implementations with a limited trace buffer would still be highly valuable.

Accordingly, what is needed is a system and method for lowering the cost of implementing trace features both for the microcontroller and for the debug tools. The present invention addresses such a need.

SUMMARY

It is the object of the present invention to provide a mechanism to store and retrieve trace information in on-chip system memory of microcontrollers. A microcontroller comprises a microprocessor and a memory device accessible through a data bus and an address bus coupled to the microprocessor. The microcontroller includes on-chip debug logic coupled to the microprocessor. The on-chip debug logic includes a debug port and a mechanism for temporarily storing trace data on the memory, wherein the trace data can be retrieved from the system memory via the debug port by a debug tool.

A method and system in accordance with the present invention will lower the cost of implementation of trace features in microcontrollers, and strongly reduce the cost of supporting such features in debug tools.

DETAILED DESCRIPTION

The present invention relates generally to on-chip debug functionality in microcontrollers and microprocessors that contain on-chip memory and more specifically to storing trace information in and extracting such information from on-chip memory. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention presents a mechanism for storing trace events in system memory and allowing them to be extracted over the low-speed debug port in the device.

The present invention includes an implementation of an on-chip trace buffer and a frame buffer, as well as a memory interface for non-intrusive memory access. Frames are extracted from the buffer and routed to the memory interface, to be stored in a circular trace buffer in system memory, instead of transmitted on a trace port. The position and size of the trace buffer in system memory are configured by debug registers, accessible by a debug tool. In a preferred embodiment, the high-speed trace port is eliminated, and the frame buffer can be reduced in size, as the bandwidth of the memory interface is close to the peak frame rate.

The trace sequence that can be captured is much smaller than when using an external debug tool for trace capture, since the trace buffer is limited to the size of the allocatable internal memory. However, as stated above, many debug situations do not require a large trace sequence, if the user can control which sequence is captured. In a system and method in accordance with the present invention, the user is presented with several options when the trace buffer becomes full:

1. Continue writing at the start of the buffer, overwriting the oldest frames.
2. Stop writing, discarding any further frames generated.
3. Halt the CPU automatically, to avoid further messages to be generated.

In any case, the debug tool can at any time halt the CPU explicitly, which prevents further trace information from being generated. The debug tool can subsequently extract the previous trace information by reading out the trace buffer from system memory, without any specific bandwidth requirement. Also, the regular debug port can be used to extract the information, eliminating the need for a dedicated trace port. In addition, mechanisms are provided to identify the portion of the buffer containing valid frames, and to extract remaining frames not yet written to the buffer. Finally, mechanisms are also provided to protect the CPU from accessing the system memory area reserved for the trace buffer, to prevent incorrect trace reconstruction.

To describe the features of the present invention in more detail refer now to the following description in conjunction with the accompanying figures.

Figure 2:
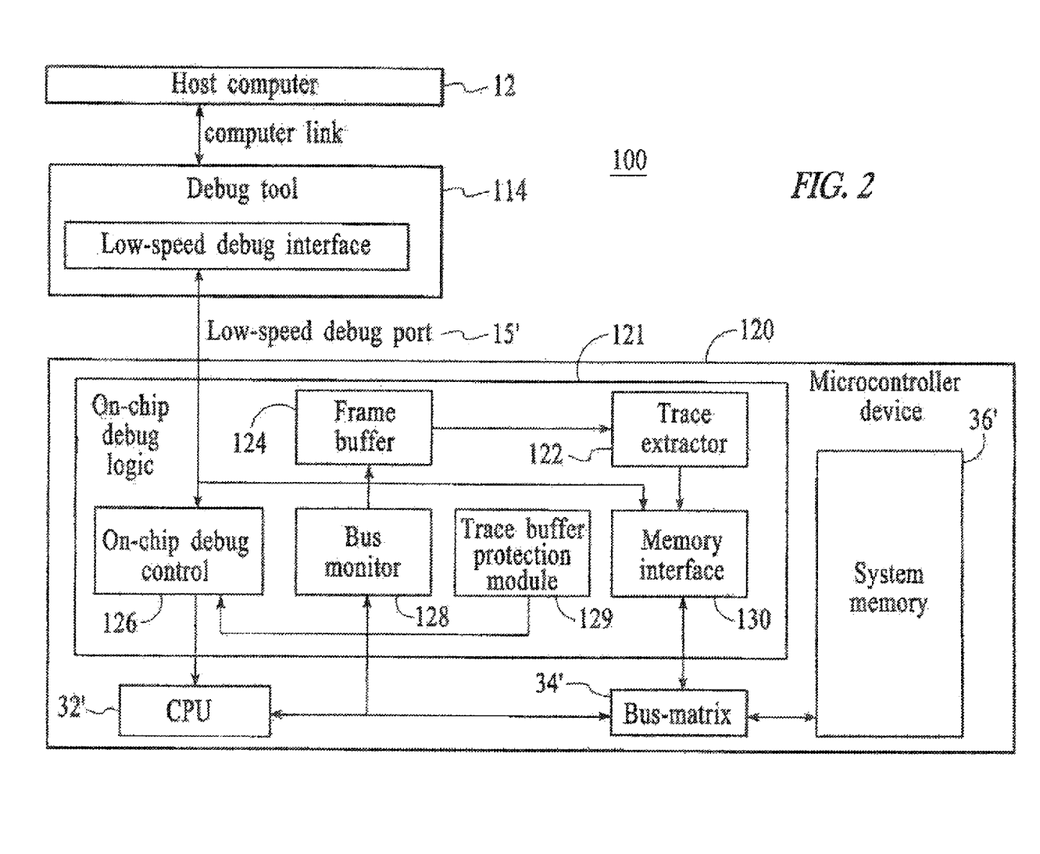
FIG. 2 illustrates a debug system in accordance with the present invention.

FIG. 2 illustrates a debug system 100 in accordance with the present invention. The debug system 100 comprises a host computer 12', a debug tool 114, a microcontroller device 120 and system memory 36'. The microcontroller device 120 includes on-chip debug logic 121, CPU 32' and a bus matrix 34'. Although system memory 36' is shown on-chip here, the memory can reside on-chip or off-chip depending on the implantation of the microcontroller device. The on-chip debug logic 121 comprises a trace extractor module 122, a trace buffer protect module 129, a frame buffer 124, an on-chip debug control 126, a bus monitor 128, and memory interface 130. In this architecture, the trace extractor module 122 is added to on-chip debug logic 121 provide a mechanism for storing trace events without adding significant cost to the microcontroller device 120. The trace extractor module 122 is an extension of the memory interface, and contains a plurality of debug registers, which can be written by the debug tool 114, and that configure the behavior of the on-chip memory trace mechanism. To describe the function of the trace extractor module 122 in more detail refer now to the following description in conjunction with the accompanying figure.

Figure 3:
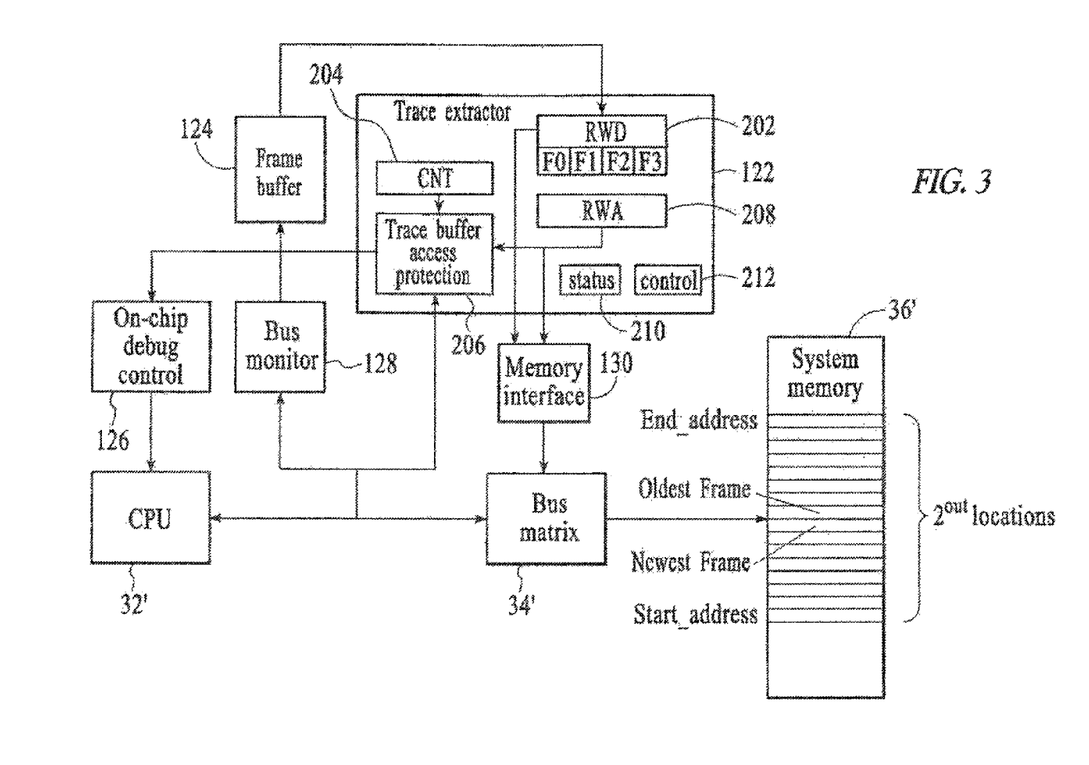
FIG. 3 illustrates the debug system with an expanded view of the trace extractor module and the system memory.

FIG. 3 illustrates the debug system 100 with an expanded view of the trace extractor module 122 and the system memory 36'. FIG. 3 comprises a frame buffer 124, on-chip debug control 126, bus monitor 128, CPU 32', bus matrix 34', memory interface 130, and trace extractor module 122. The trace extractor module 122 comprises a trace buffer 122, a RWD register 202, CNT register 204, trace buffer access protection 206, a RWA register 208, status registers 210 and a plurality of control registers 212.

As before mentioned, the trace extractor module 122 includes a plurality of debug registers which can be written by the debug tool 114. The registers can be summarized as follows:

RWA register 208: An automatically incremented register, reflecting the next system memory address to be written.

RWD register 202: a register collecting frames into bus-sized units.

CNT register 204: the logarithmic size of the trace buffer.

Control register 212: a control register indicating the actions taken when the trace buffer is full. Valid states are WRAP, STOP, and BREAK.

Status registers 210: a plurality of single-bit read-only registers indicating the status of the trace buffer 206.

The following definitions describe the status of the trace buffer 206:

WRAPPED: The trace buffer 206 has been overwritten, and old messages have been discarded.

NTBF: A breakpoint has been issued due to the trace buffer 206 being full.

NTAE: A breakpoint has been issued due to the CPU 32' trying to access the trace buffer 206.

Referring further to FIG. 3, the debug tool 114 reserves a portion of system memory 36' for the trace buffer 206 by writing the RWA register 208 to the START_ADDRESS, and writing the CNT register 204 with the logarithmic buffer size, creating a buffer END_ADDRESS=(START_ADDRESS+ $2^{CNT}-1$). The implicit address unit used is the system bus access width, e.g. word=32 bits.

The trace extractor module 122 accumulates frames from the frame buffer 124 into the RWD register 202, which is the same width as the system data bus. This register 202 collects frames until full, e.g., if the frame size is 8 bits, and the data bus 32 bits, the RWD register 202 can hold 4 frames.

When RWD 202 is full, the contents of the register are written through the memory interface 130 to the system memory 36' address pointed to by the RWA register 208. After this operation, the RWA register 208 is auto-incremented to point to the next location in the buffer. The RWD register 202 is cleared, i.e., filled with only empty frames.

When RWA 208 increments beyond END_ADDRESS, the MODE register defines the resulting behavior:

In a =WRAP mode: the RWA register 208 is reset to START_ADDRESS, and the trace buffer 206 is overwritten without halting the CPU 32'. The WRAPPED status bit is set. The debug tool 114 must halt the CPU 32' before reconstruction of trace data can begin. The captured trace data will contain the last frames before the CPU 32' was halted.

In a =STOP mode: No further trace frames are written to system memory 36', but the CPU 32' is not halted. The debug tool must halt the CPU 32' before reconstruction of trace data can begin. The captured trace data will contain the first frames after the capture sequence was started.

In a =BREAK mode: No further trace frames are written to system memory 36', and the CPU 32' is halted. The NTBF status is set, to identify this breakpoint. Reconstruction of the trace frames can commence immediately. The captured trace data will contain all frames after the capture sequence was started.

Once the CPU 32' is halted, regardless of reason for the breakpoint, the debugger can read out the valid trace frames from the system memory 36' using the low speed debug port 15 and the memory interface 130.

The location of valid frames in the trace buffer 206 depends on whether the circular trace buffer in system memory 36' was overwritten or not, as indicated by the WRAPPED status bit. The WRAP status bit has the following states:

WRAPPED=0: The trace buffer 206 contains valid trace frames from START_ADDRESS through (RWA-1).

WRAPPED=1: The trace buffer 206 contains valid trace frames from END_ADDRESS plus START_ADDRESS through (RWA-1).

Example

Figure 4:
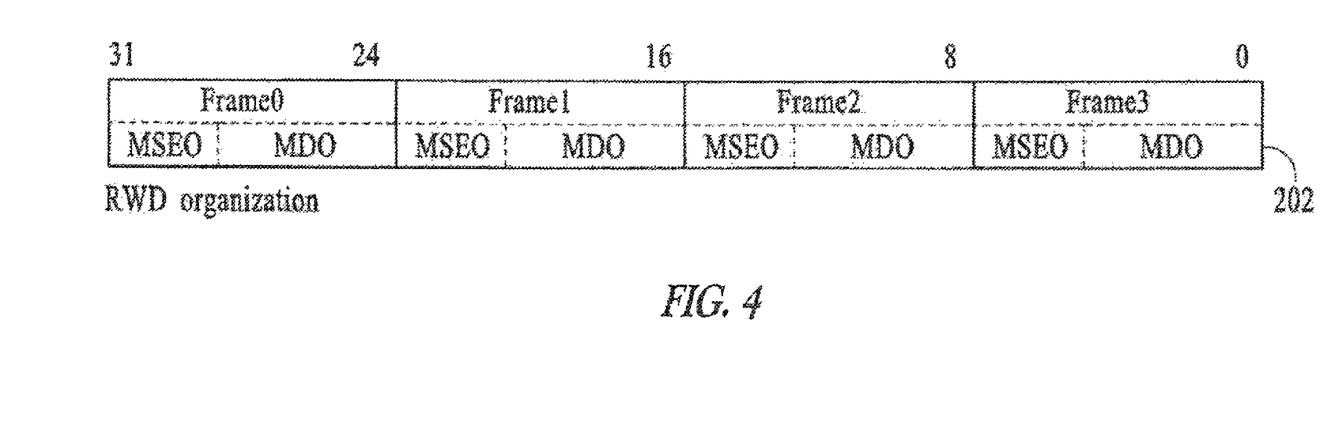
FIG. 4 shows RWD register organization.

Assuming an implementation using 8-bit Nexus-compatible frames (2-bit MSEO control and 6-bit MDO data), and a big-endian 32-bit system bus, the RWD register 202 will be organized as shown in FIG. 4. Accordingly this register collects frames into bus-sized units.

Figure 5:
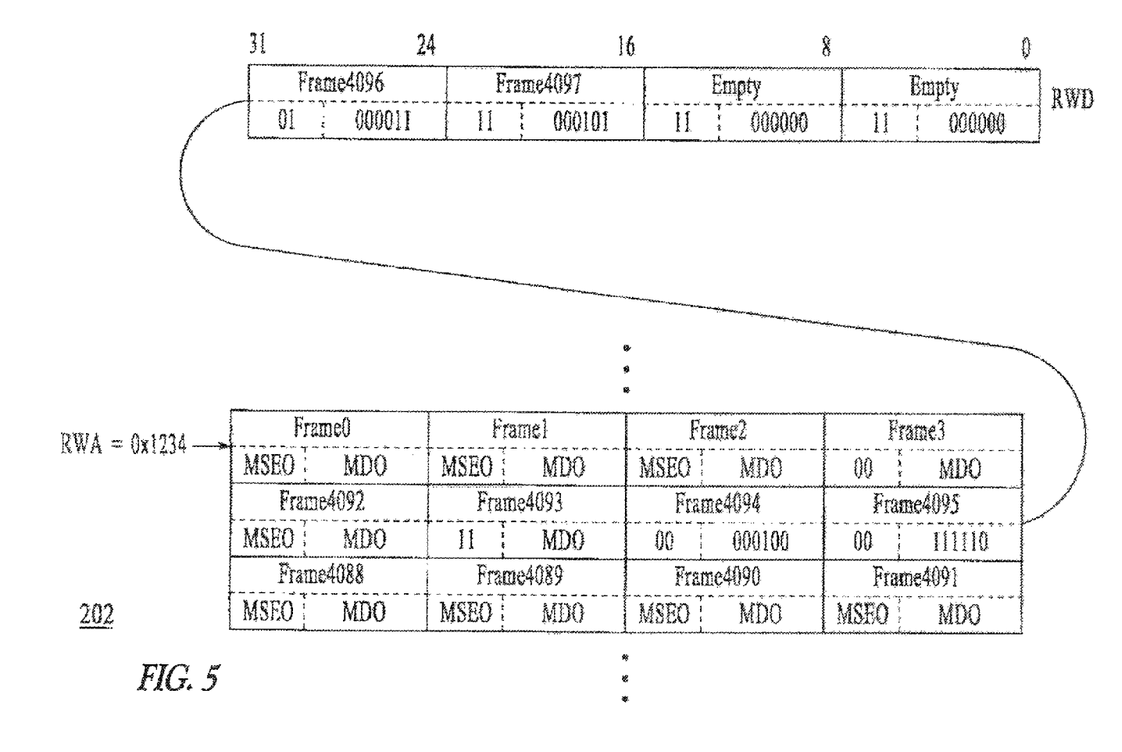
FIG. 5 shows reconstructing a message from the trace buffer.

FIG. 5 shows reconstructing a message from the trace buffer 206 (FIG. 3). In this example a message from the trace buffer 206 is shown after the CPU 32' has been halted, with the RWA register 208 starting at 0x1000 and the CNT register=10 (i.e. the buffer size is 1024 words, or 4096 frames). When the trace was stopped, the WRAPPED status bit is set and the RWA register 208=0x1234, so the last word of frame data written to the memory is located at 0x1230. The last two frames of the message still reside in the RWD register 202, which has been only partially filled.

If the RWD register 202 was not full by the time the breakpoint occurred, these frames are not written to the trace buffer 206. If the debug tool intends to read out the trace buffer 206, the last frames can be found by reading the RWD register 202, after reading out to the trace buffer 206.

If the debug tool 114 does not intend to read out the trace buffer 206, e.g. due to a non-trace-related breakpoint, it can let the CPU 32' return to normal operation, and the trace operation will continue, transparently to the debug tool 114.

The mechanism described above assumes that the system memory 36' is a shared resource between CPU and OCD logic. This means that a software error in the CPU 32' can potentially corrupt the trace data by accidentally writing to the trace buffer 206 in system memory 36'. This is particularly unfortunate, since loss of trace data increases the difficulty in locating this software error. To prevent this, a trace buffer protection module 129 (FIG. 2), containing a comparator unit, monitors CPU accesses to system memory 36', ensuring that any accesses between START_ADDRESS and END_ADDRESS will result in halting the CPU 32' through a breakpoint, with the NTAE status bit set.

A system and method in accordance with the present invention lowers the cost of implementing trace features for the microcontroller and for the debug tools by offering a mechanism to temporarily store data in on-chip memory, to allow this data to be retrieved at an arbitrarily low bandwidth via a low speed debug port by the debug tool at a later time. A system and method in accordance with the present invention eliminates the need for a dedicated trace port in the device, reduces the size of the frame buffer, and eliminates the need for high-speed logic in the debug tool.

A system and method in accordance with the present invention allows for the implementation of more powerful trace features in microcontrollers without increasing the pin cost of debug features. It also allows strongly improved support for third party debug tools with trace capability, allowing more customers to take advantage of microcontrollers with on-chip trace features.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method comprising:
   storing trace data in a trace buffer portion of system memory, where the system memory is coupled to a microprocessor using a data bus;
   retrieving, by a trace extractor module, the trace data from the trace buffer;
   communicating the retrieved trace data to a debug port, where the debug port is included with on-chip debug logic coupled to the microprocessor and the system memory; and
   identifying, by a trace buffer protection module in communication with the trace extractor module, illegal microprocessor access to system memory locations within the trace buffer.

2. The method of claim 1, wherein the system memory resides on-chip and the system memory includes memory accessible by the microprocessor that is distinct from the trace buffer.

3. The method of claim 1, wherein the debug port includes a low speed debug port.

4. The method of claim 1, further comprising determining a behavior of the trace extractor module based on a plurality of debug registers included with the trace extractor module.

5. The method of claim 4, wherein the plurality of debug registers includes:
   a first register indicative of a next system memory address for storing trace data;
   a second register to collect frames into bus-sized units;

a third register to store the size of the trace buffer; a fourth register to indicate a control method when the trace buffer is full; and a plurality of status registers, wherein each of the plurality of status registers are single-bit, read-only registers indicating the status of the trace buffer.

6. The method of claim 1, wherein the on-chip debug logic includes:

a bus matrix coupled to the trace extractor module and in communication with the trace buffer protection module, the bus matrix configured to communicate with the system memory.

7. The method of claim 1, further comprising:

identifying, by the trace buffer protection module, illegal microprocessor access to system memory locations within the trace buffer based on the status of a comparator; and halting the microprocessor when an illegal access is identified.

8. A microcontroller comprising:

a shared memory device;

a microprocessor configured to read and write microcontroller data from and to the shared memory device;

on-chip debug logic configured to:

accumulate trace frames into a frame register; and provide the contents of the frame register to the shared memory device when the frame register is full; and a debug port configured to facilitate communication of trace frames from the shared memory.

9. The microcontroller of claim 8, wherein the on-chip debug logic is configured to provide the contents of the first register to a trace buffer of the shared memory device when the first register is full.

10. The microcontroller of claim 9, wherein the trace buffer is a circular trace buffer of the shared memory device.

11. The microcontroller of claim 10, wherein the circular trace buffer includes a status register indicative of whether the circular trace buffer has been overwritten at least once during the trace capture sequence.

12. The microcontroller of claim 9, wherein the on-chip debug logic is configured to stop the trace capture sequence when the trace buffer is full.

13. The microcontroller of claim 12 wherein the on-chip debug logic is configured to suspend execution of the microprocessor at a buffer full breakpoint.

14. The microcontroller of claim 13, wherein the on-chip debug logic is configured to set a trace buffer full status bit to identify the cause of the buffer full breakpoint.

15. The microcontroller of claim 9, wherein the on-ship debug logic is configured to:

identify illegal microprocessor access to memory locations within the trace buffer; and generate an illegal access breakpoint when an illegal access is identified.

16. The microcontroller of claim 15, wherein the on-chip debug logic is configured to set an illegal access status bit.

17. The microcontroller of claim 8, wherein the on-chip debug logic is configured to determine if the frame register includes an unsaved trace frame.

* * * * *

UNITED STATES PATENT AND TRADEMARK OFFICE
CERTIFICATE OF CORRECTION

PATENT NO. : 8,370,687 B2  
APPLICATION NO. : 13/527502  
DATED : February 5, 2013  
INVENTOR(S) : Frode Milch Pedersen and Are Arseth Page 1 of 1

It is certified that error appears in the above-identified patent and that said Letters Patent is hereby corrected as shown below:

In the Specification

Column 5, Line 37: delete "(RWA-l)." and insert --(RWA-1).--.

Column 5, Line 40: delete "(RWA-l)." and insert --(RWA-1).--.

In the Claims

Column 8, Claim 15, Line 19: delete "on-ship" and insert --on-chip--.

Signed and Sealed this
Twenty-second Day of April, 2014

Michelle K. Lee
*Deputy Director of the United States Patent and Trademark Office*